(12) United States Patent
Tang (10) Patent No.: US 12,411,531 B2
(45) Date of Patent: Sep. 9, 2025

(54) SPLIT-TYPE CASE STRUCTURE THAT FACILITATES HEAT DISSIPATION

(71) Applicant: DONGGUAN SUNPRO INDUSTRIAL DEVELOPMENT CO., LTD, Dongguan (CN)

(72) Inventor: Saihua Tang, Dongguan (CN)

(73) Assignee: DONGGUAN SUNPRO INDUSTRIAL DEVELOPMENT CO., LTD, Dongguan (CN)

( * ) Notice: Subject to any disclaimer, the term of this patent is extended or adjusted under 35 U.S.C. 154(b) by 229 days.

(21) Appl. No.: 18/221,551

(22) Filed: Jul. 13, 2023

(65) Prior Publication Data
US 2025/0013273 A1 Jan. 9, 2025

(30) Foreign Application Priority Data

Jul. 6, 2023 (CN) .......................... 202321771157.5

(51) Int. Cl.
*G06F 1/00* (2006.01)
*G06F 1/18* (2006.01)
*G06F 1/20* (2006.01)

(52) U.S. Cl.
CPC ............. *G06F 1/181* (2013.01); *G06F 1/206* (2013.01)

(58) Field of Classification Search
CPC . G06F 1/181; G06F 1/206; G06F 1/20; G06F 1/183; H05K 7/20172
USPC ................. 312/223.2; 454/184; 361/679.33, 361/679.02, 679.32, 679.34, 679.58, 724, 361/725, 727, 679.49, 678, 679.5, 690, 361/694
See application file for complete search history.

(56) References Cited

U.S. PATENT DOCUMENTS

| | | | | |
|---|---|---|---|---|
| 4,728,160 A | * | 3/1988 | Mondor ................. | G06F 1/181 361/679.48 |
| 5,813,243 A | * | 9/1998 | Johnson ................. | G06F 1/20 361/678 |
| 6,618,248 B1 | * | 9/2003 | Dalheimer ............. | G06F 1/20 361/679.33 |

(Continued)

FOREIGN PATENT DOCUMENTS

| CN | 107765809 A | * | 3/2018 | |
| CN | 114815997 A | * | 7/2022 | ............ G06F 1/181 |
| CN | 116088657 A | * | 5/2023 | |

OTHER PUBLICATIONS

CN114815997 English translation (Year: 2022).*

*Primary Examiner* — Janet M Wilkens
(74) *Attorney, Agent, or Firm* — Birchwood IP (57) ABSTRACT

A split-type case structure that facilitates heat dissipation, comprising a case body, wherein the case body is composed of a power supply case and a motherboard case, wherein the power supply case and the motherboard case are configured to be split, wherein an air intake slot is provided between the power supply case and the motherboard case, and the power supply case and the motherboard case are respectively provided with an air intake plate on a side close to the air intake slot, and the power supply case and the motherboard case are connected through a wiring slot. The present application adopts a split-type case to replace the traditional one-piece case. The power supply and the motherboard are separated through the power supply case and the motherboard case, and are connected through the wiring slot.

7 Claims, 6 Drawing Sheets

(56) References Cited

U.S. PATENT DOCUMENTS

| | | | | |
|---|---|---|---|---|
| 8,089,762 | B2* | 1/2012 | Makley | G06F 1/20 |
| | | | | 361/679.48 |
| 8,416,567 | B2* | 4/2013 | Cheng | G06F 1/20 |
| | | | | 361/679.48 |
| 11,259,440 | B1* | 2/2022 | Chen | G06F 1/181 |
| 2003/0124971 | A1* | 7/2003 | Williams | G06F 1/20 |
| | | | | 454/184 |
| 2007/0188996 | A1* | 8/2007 | Liang | H05K 7/20009 |
| | | | | 361/752 |
| 2007/0217139 | A1* | 9/2007 | Lin | G06F 1/20 |
| | | | | 312/223.1 |
| 2014/0131090 | A1* | 5/2014 | Gingrich | H02B 1/565 |
| | | | | 174/560 |
| 2015/0091420 | A1* | 4/2015 | Liu | G06F 1/181 |
| | | | | 312/223.2 |

\* cited by examiner

SPLIT-TYPE CASE STRUCTURE THAT FACILITATES HEAT DISSIPATION

CROSS-REFERENCE TO RELATED APPLICATIONS

This application claims the benefit and priority of Chinese patent application No. 202321771157.5, filed on Jul. 6, 2023, disclosure of which is hereby incorporated by reference in its entirety.

TECHNICAL FIELD

The present application relates to the technical field of computer case, in particular to a split-type case structure that facilitates heat dissipation.

BACKGROUND

The structure of the traditional computer case mostly adopts an integrated case, that is, all parts including the power supply, motherboard and heat dissipation structure are installed in the same case space. This structure still occupies the mainstream of the market, and it has the advantages of convenient installation and low cost.

However, in practice, the integrated case also has the following problems that cannot be ignored:

1. Heat dissipation problem. Because the all-in-one case assembles the power supply and the motherboard and other parts in the same space, the motherboard is the part that generates the most heat among all the parts in the case, and has extremely high requirements for heat dissipation, and the power supply is the largest part of the overall structure. Usually, in the existing case structure, the power supply will be installed near the motherboard, so that the power supply will greatly block the heat exchange between the motherboard and the air, especially in the case of an air-cooled heat dissipation structure, the problem of difficult heat dissipation of the motherboard is particularly obvious;

2. Market competition issues. With the development of the market, the all-in-one case market is approaching saturation, and the various external structures and lighting effects of the case have caused aesthetic fatigue to consumers. Further innovations on the all-in-one case, the cost is no longer directly proportional to the income. Under such circumstances, it is even more necessary to get out of the thinking pattern of an all-in-one case and make effective innovations in its functions and structures, which can greatly attract the attention of consumers and enhance the competitiveness of the product in the market.

To sum up, there is a need for a case structure different from the traditional all-in-one case. On the one hand, the power supply needs to be separated from the motherboard. On the other hand, the structure needs to be unique enough to attract more consumers and expand market competitiveness.

SUMMARY

The purpose of the present application is to provide a split-type case structure that facilitates heat dissipation, so as to solve the problems raised in the above-mentioned background technology.

In order to achieve the above object, the application provides the following technical solutions:

A split-type case structure that facilitates heat dissipation, comprising:

a case body, configured for assembling power supply, motherboard computer host parts, wherein the case body comprises a power supply case and a motherboard case, wherein the power supply case and the motherboard case are configured to be split, wherein an air intake slot is provided between the power supply case and the motherboard case, and the power supply case and the motherboard case are respectively provided with an air intake plate on a side close to the air intake slot, and the power supply case and the motherboard case are connected through a wiring slot.

In the present application, the power supply case is arranged under the motherboard case, and correspondingly, an air inlet top plate is arranged on top of the power supply case, and an air inlet bottom plate is arranged on bottom of the motherboard case, and the air inlet top plate and the air inlet bottom plate are matched with the air inlet slot.

Further, air inlet holes are formed on the air inlet top plate and the air inlet bottom plate, so that an external airflow is delivered to the power supply case and the motherboard case through the air inlet holes.

In the present application, the bottom and side of the power supply case are provided with case baffles with air inlet holes respectively, and the power supply is arranged inside the power supply case.

Further, auxiliary heat dissipation holes are also provided on a side wall of the motherboard case, and the motherboard and a motherboard heat dissipation structure matched with the motherboard are arranged in the motherboard case.

Furthermore, the motherboard heat dissipation structure is an air-cooled heat dissipation structure.

Preferably, the motherboard heat dissipation structure is water-cooled heat dissipation structure.

Furthermore, the power supply is electrically connected to the motherboard through lines, and the lines are arranged in the wiring slot.

In the present application, a case top cover is provided on top of the motherboard case, the case top cover covers the motherboard case and the wiring slot, and several interfaces and a power button are provided at a position where the case top cover corresponds to the wiring slot.

In the present application, baffles on both sides of the motherboard case are made of glass.

Compared with the prior art, the beneficial effects of the present application are as follows:

The present application adopts a split-type case to replace the traditional one-piece case. The power supply and the motherboard are separated through the power supply case and the motherboard case, and are connected through the wiring slot. At the same time, an air intake slot is arranged in the middle of the power supply case and the motherboard case, and the air intake top plate and the air intake bottom plate are used to enhance the heat dissipation effect of the two cases, thereby avoiding the problem that the power supply in the traditional all-in-one case blocks the heat dissipation of the motherboard. Cooperating with the heat dissipation structure can greatly improve the heat dissipation effect of the motherboard, thereby improving the overall operation effect of the computer. The unique structure of the split-type case can also improve its competitiveness in the market.

Reference signs: 100. Power supply case; 101. Air intake top plate; 102. Air intake hole; 103. Case baffle; 200. Motherboard case; 201. Air intake bottom plate; 202. Auxiliary heat dissipation hole; 203. Case top cover; 204. Interface, 205. Power button; 206. Glass; 300. Air intake slot; 400. Wiring slot; 500. power supply; 600. motherboard.

DETAILED DESCRIPTION

The technical solution in the embodiment of the present application will be clearly and completely described below in conjunction with the accompanying drawings in the embodiment of the present application. Apparently, the described embodiments are only some of the embodiments of the present application, not all of them. Based on the embodiments in the present application, all other embodiments obtained by persons of ordinary skill in the art without making creative efforts belong to the protection scope of the present application.

Embodiment 1

Figure 1:
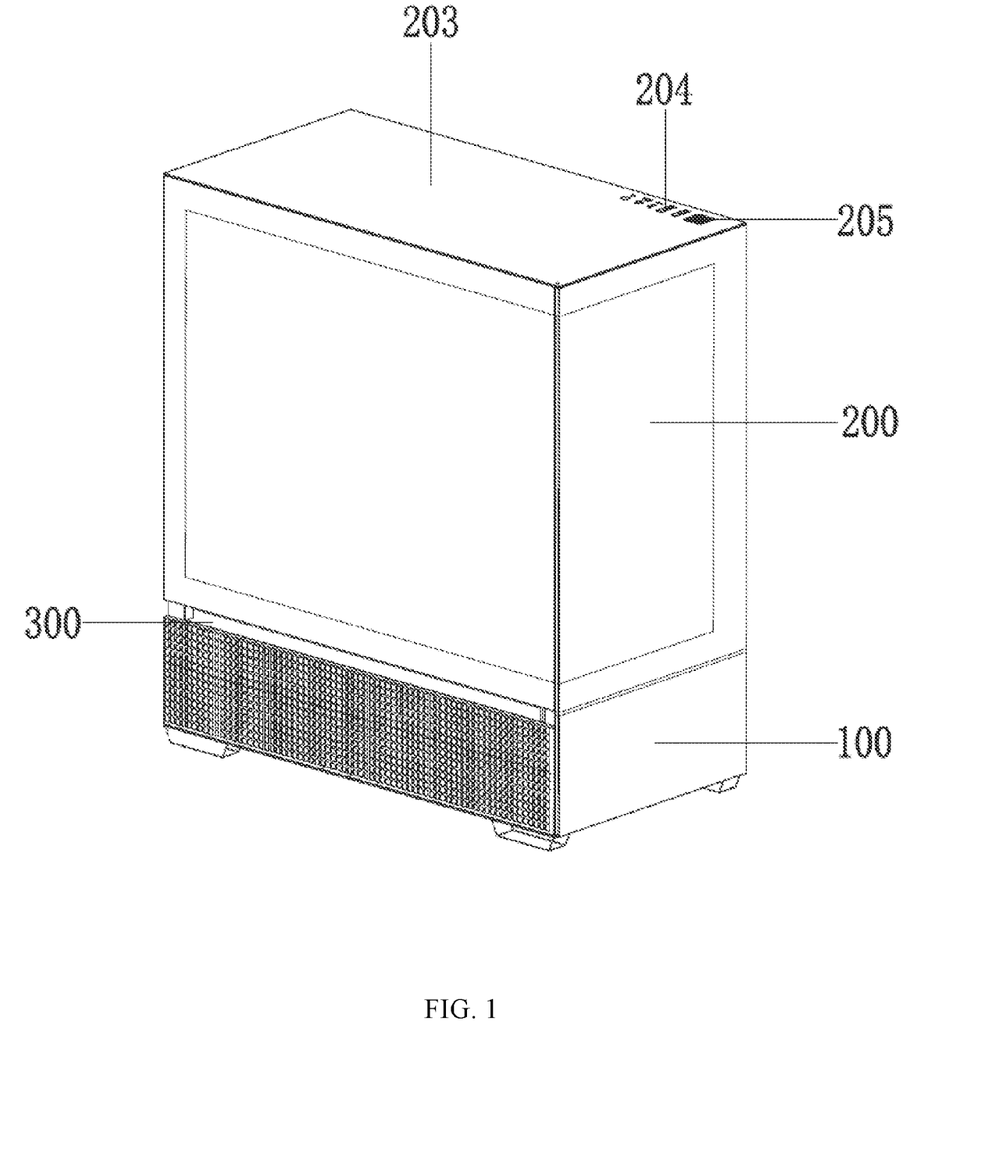
FIG. 1 is the overall structural diagram of the present application.
Figure 2:
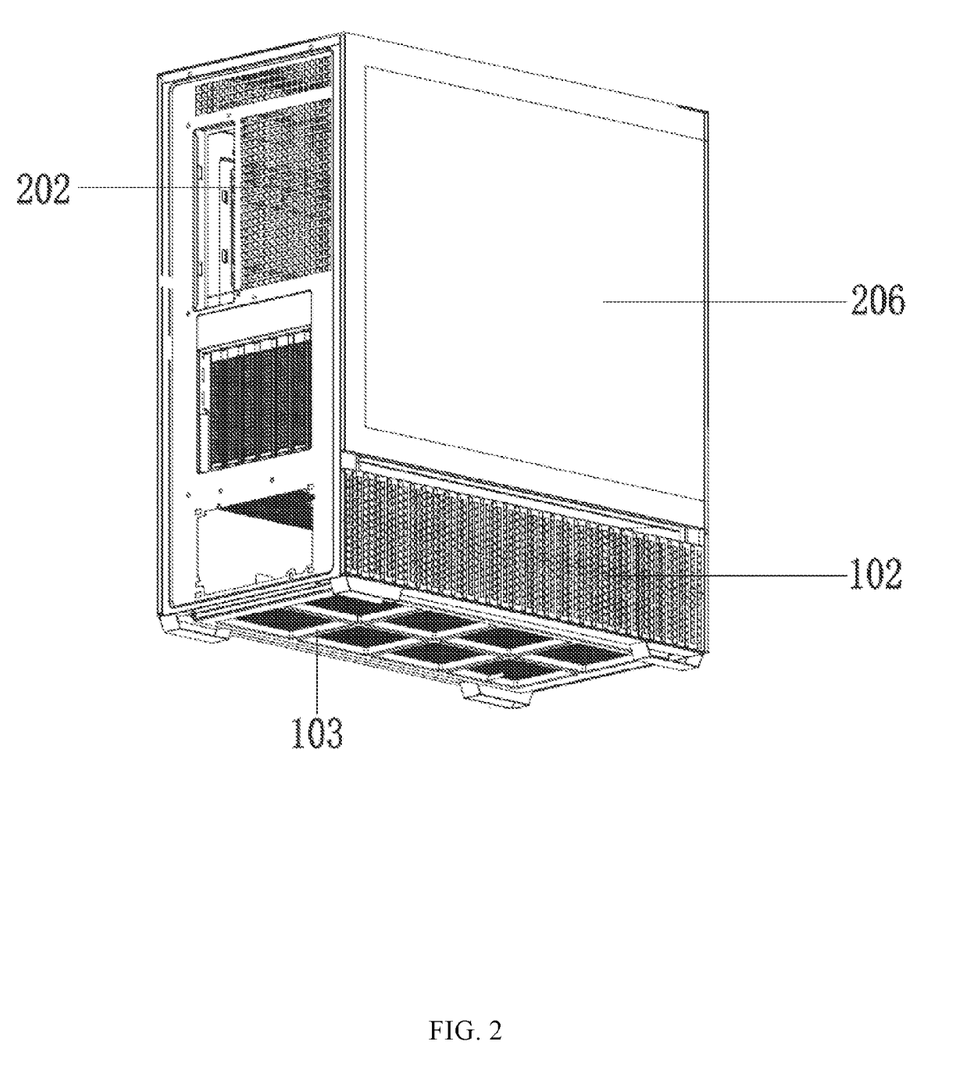
FIG. 2 is the overall structural diagram of the present application on another angle.
Figure 3:
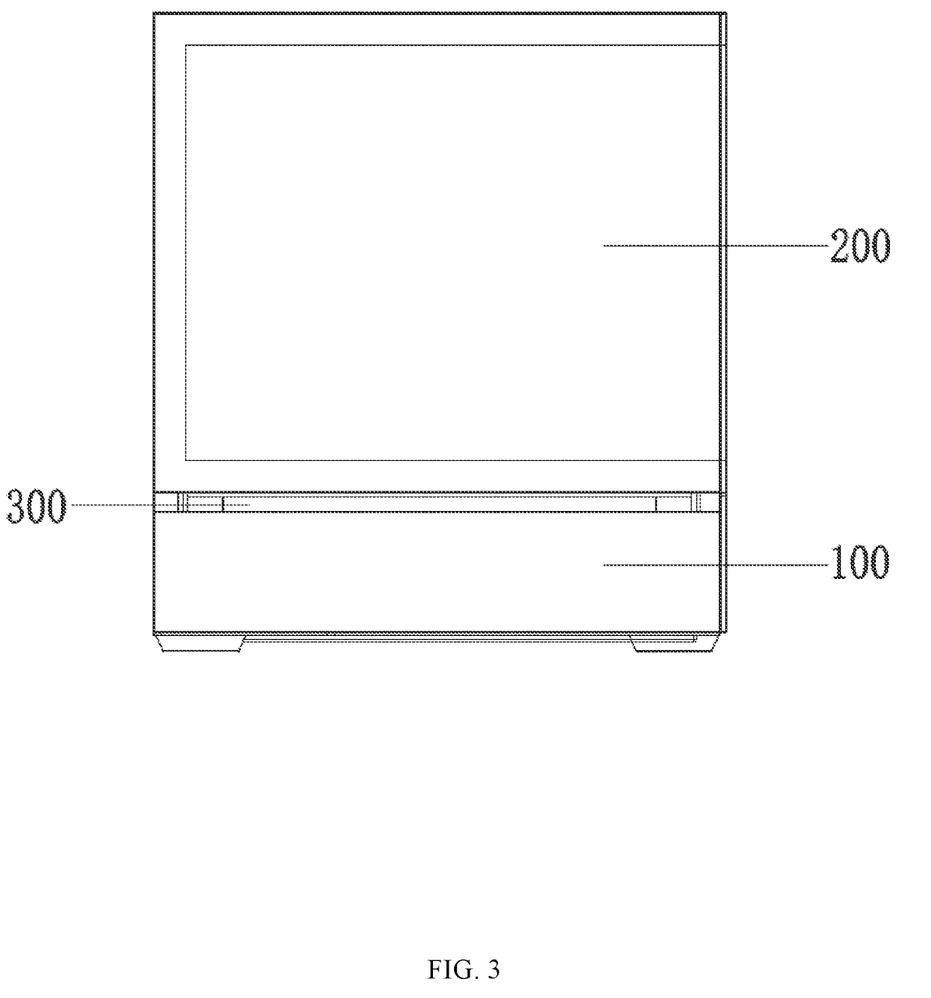
FIG. 3 is the overall structural side view of the present application.
Figure 4:
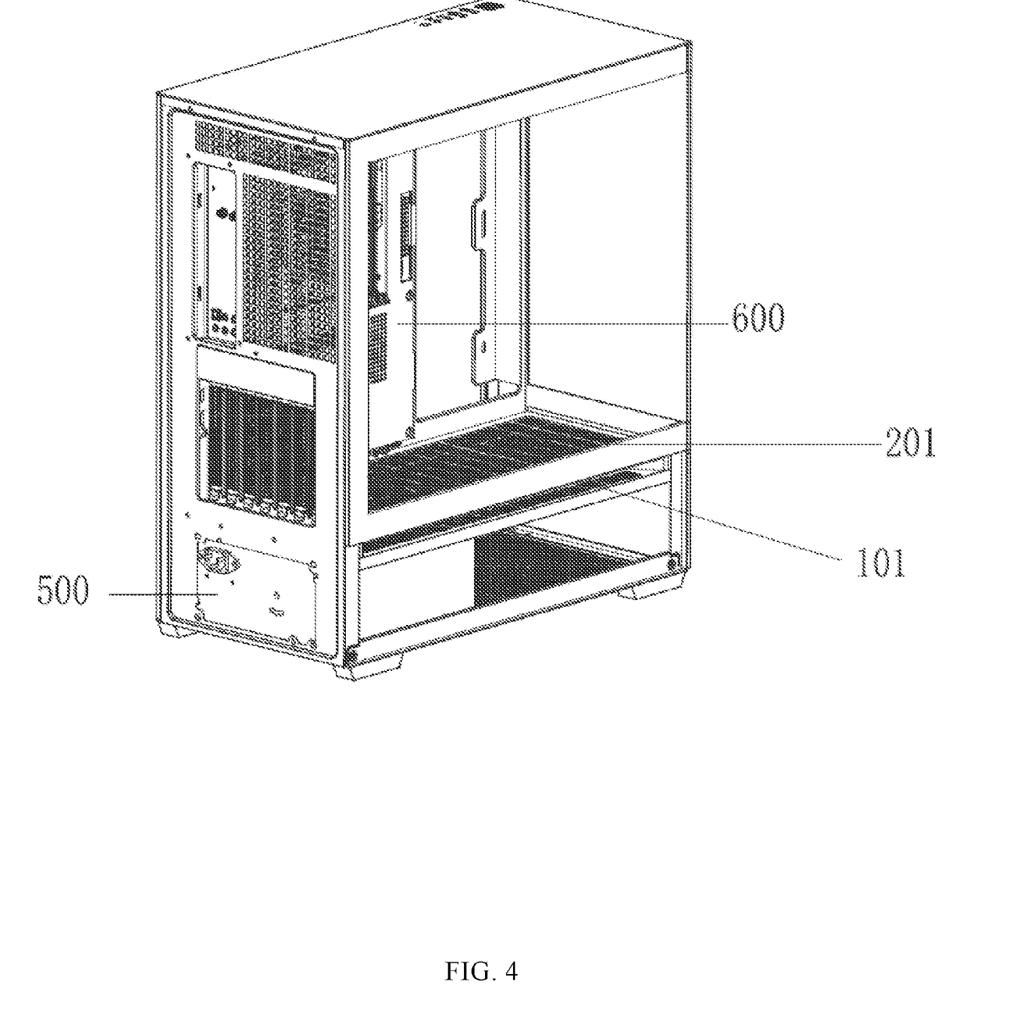
FIG. 4 is a partial structural diagram of the present application.
Figure 5:
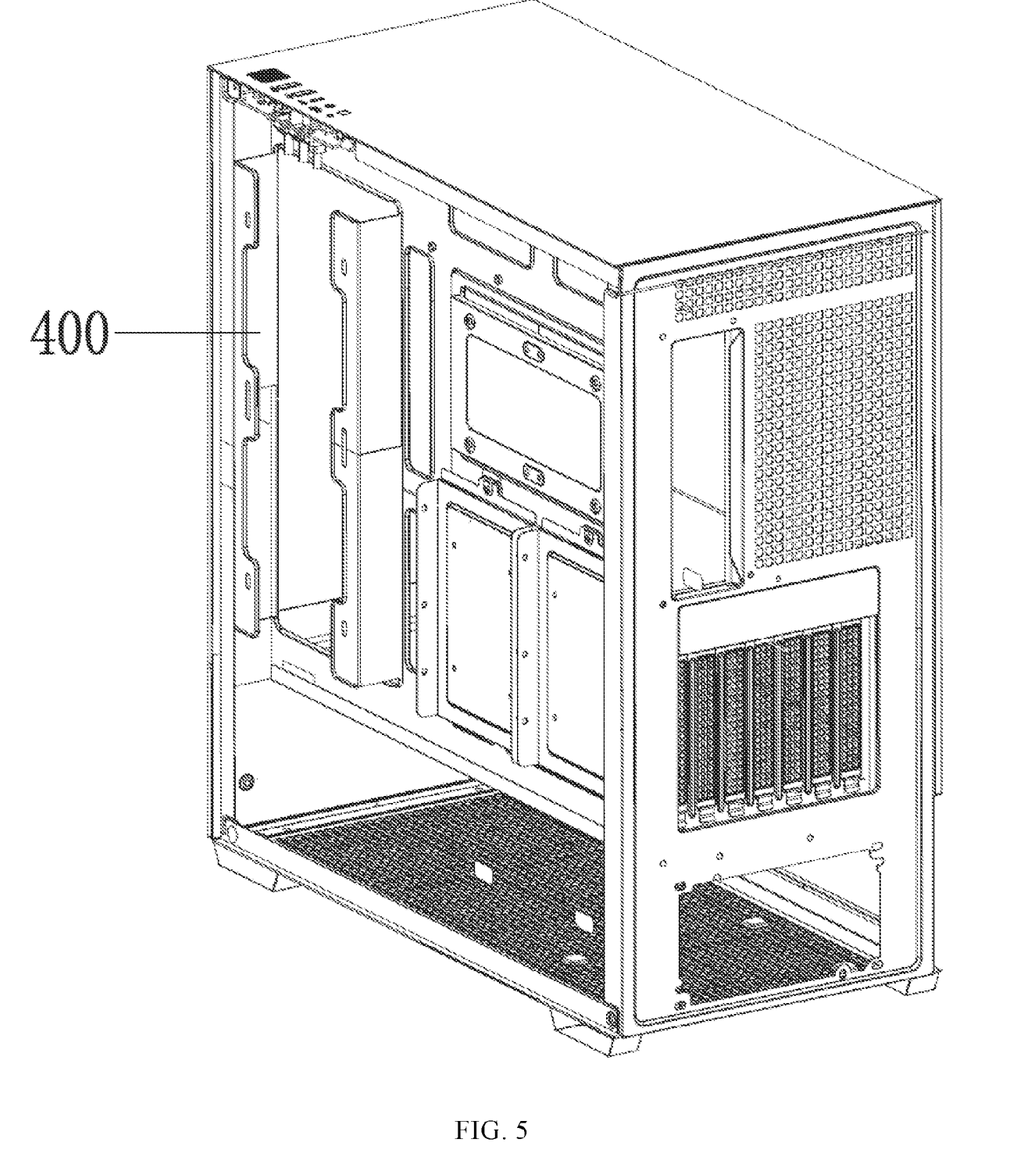
FIG. 5 is partial structural diagram of the present application on another angle.
Figure 6:
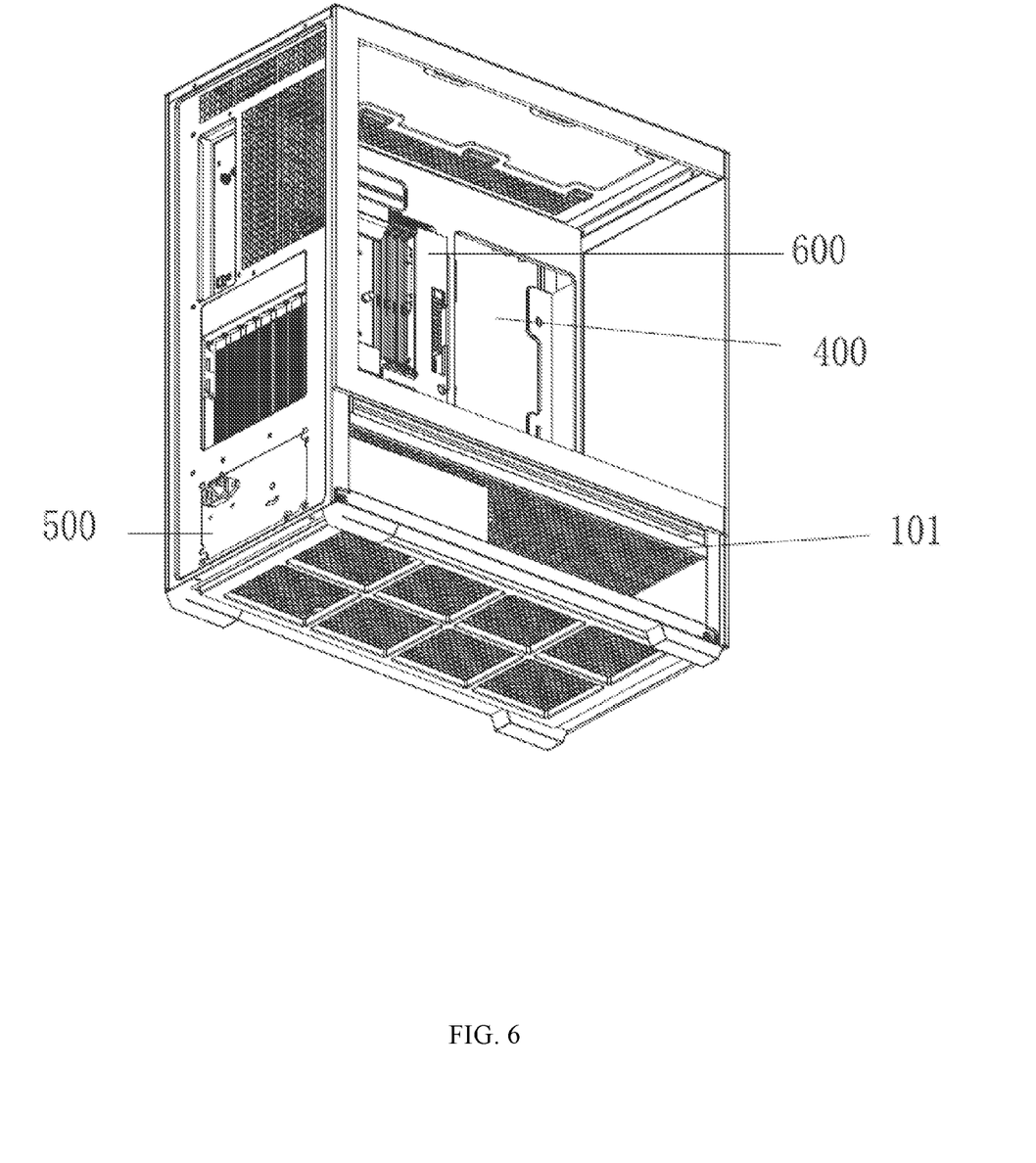
FIG. 6 is a partial structural view of the present application on a third angle.

Please refer to FIGS. 1-6, an embodiment provided by the present application:

A case body, configured for assembling power supply 500, motherboard computer host parts, wherein the case body comprises a power supply case 100 and a motherboard case 200, wherein the power supply case 100 and the motherboard case 200 adopt a split design and are independent of each other, wherein an air intake slot 300 is provided between the power supply case 100 and the motherboard case 200, and the power supply case 100 and the motherboard case 200 are respectively provided with an air intake plate on a side close to the air intake slot 300, and the power supply case 100 and the motherboard case 200 are connected through a wiring slot 400.

In this embodiment, the power supply case 100 is arranged under the motherboard case 200, and correspondingly, an air inlet top plate 101 is arranged on top of the power supply case 100, and an air inlet bottom plate 201 is arranged on bottom of the motherboard case 200, and the air inlet top plate 101 and the air inlet bottom plate 201 are matched with the air inlet slot 300.

Further, air inlet holes 102 are formed on the air inlet top plate 101 and the air inlet bottom plate 201, so that an external airflow is delivered to the power supply case 100 and the motherboard case 200 through the air inlet holes 102.

In this embodiment, the bottom and side of the power supply case 100 are provided with case baffles 103 with air inlet holes 102 respectively, and the power supply 500 is arranged inside the power supply case 100.

Further, auxiliary heat dissipation holes 202 are also provided on a side wall of the motherboard case 200, and the motherboard 600 and a motherboard heat dissipation structure matched with the motherboard 600 are arranged in the motherboard case.

Furthermore, the motherboard heat dissipation structure is an air-cooled heat dissipation structure.

Furthermore, the power supply 500 is electrically connected to the motherboard 600 through lines, and the lines are arranged in the wiring slot 400.

In this embodiment, a case top cover 203 is provided on top of the motherboard case 200, the case top cover 203 covers the motherboard case 200 and the wiring slot 400, and several interfaces 204 and a power button 205 are provided at a position where the case top cover 203 corresponds to the wiring slot 400.

In this embodiment, baffles on both sides of the motherboard case 200 are made of glass 206.

Working Principle:

During use, firstly, the heat dissipation structure in the mainboard case 200 works to dissipate heat from the mainboard located in the mainboard case 200. At the same time, the external air flows into the motherboard case 200 through the air inlet slot 300, the air inlet holes 102 of the air inlet bottom plate 201 and the auxiliary heat dissipation holes 202, so that the motherboard 600 can exchange heat with the external air, thereby further improving the heat dissipation effect of the motherboard 600. Moreover, during this process, the power supply 500 with a large overall volume is not arranged in the motherboard case 200, so as not to block the heat dissipation of the motherboard 600.

At the same time, the power supply 500 in the power supply case 100 performs heat exchange with the external air through the cooling fan provided with the power supply 500 in conjunction with the air inlet slot, the air inlet holes 102 on the air inlet top plate 101, and the air inlet holes 102 on the case baffle 103, so that the heat dissipation of the power supply 500 is realized.

Embodiment 2

In this embodiment, the motherboard heat dissipation structure is water-cooled heat dissipation structure. Compared with air-cooled heat dissipation, water-cooled heat dissipation has higher heat exchange efficiency, which can further improve the heat dissipation effect of the motherboard 600.

It will be obvious to a person skilled in the art that the present application is not limited to the details of the exemplary embodiments described above. The present application can be implemented in other specific forms without departing from the spirit or essential characteristics of the present application. Therefore, the embodiments should be regarded as exemplary rather than restrictive in every respect.

The protection scope of the present application is defined by the appended claims rather than the above description, and all changes that come within the meaning and range of equivalency of the claims are intended to be embraced therein.

What is claimed is:

1. A split-type case structure that facilitates heat dissipation, comprising:
   a case body, configured for assembling a power supply, motherboard computer host parts, wherein the case body comprises a power supply case and a motherboard case, wherein the power supply case and the motherboard case are configured to be split, wherein an air intake slot is provided between the power supply case and the motherboard case, and the power supply case and the motherboard case are respectively provided with an air intake plate on a side close to the air intake slot, and the power supply case and the motherboard case are connected through a wiring slot;

wherein the power sup 1 case is arranged under the motherboard case and correspondingly, an air inlet top plate is arranged on top of the power supply case, and an air inlet bottom plate is arranged on bottom of the motherboard case, and the air inlet top plate and the air inlet bottom plate are matched with the air inlet slot.

2. The split-type case structure that facilitates heat dissipation according to claim 1, wherein air inlet holes are formed on the air inlet top plate and the air inlet bottom plate, so that an external airflow is delivered to the power supply case and the motherboard case through the air inlet holes.

3. The split-type case structure that facilitates heat dissipation according to claim 1, wherein the bottom and side of the power supply case are provided with case baffles with air inlet holes respectively, and the power supply is arranged inside the power supply case.

4. The split-type case structure that facilitates heat dissipation according to claim 1, wherein auxiliary heat dissipation holes are also provided on a side wall of the motherboard case, and a motherboard and a motherboard heat dissipation structure matched with the motherboard are arranged in the motherboard case.

5. The split-type case structure that facilitates heat dissipation according to claim 4, wherein the power supply is electrically connected to the motherboard.

6. The split-type case structure that facilitates heat dissipation according to claim 1, wherein a case top cover is provided on top of the motherboard case, the case top cover covers the motherboard case and the wiring slot, and several interfaces and a power button are provided at a position where the case top cover corresponds to the wiring slot.

7. The split-type case structure that facilitates heat dissipation according to claim 1, wherein baffles on both sides of the motherboard case are made of glass.

* * * * *